March 3, 1936.  H. Z. COBB  2,032,869
MEANS FOR MAKING MOLDED ARTICLES
Filed May 21, 1930  3 Sheets-Sheet 1

INVENTOR
Henry Z. Cobb
BY
ATTORNEY

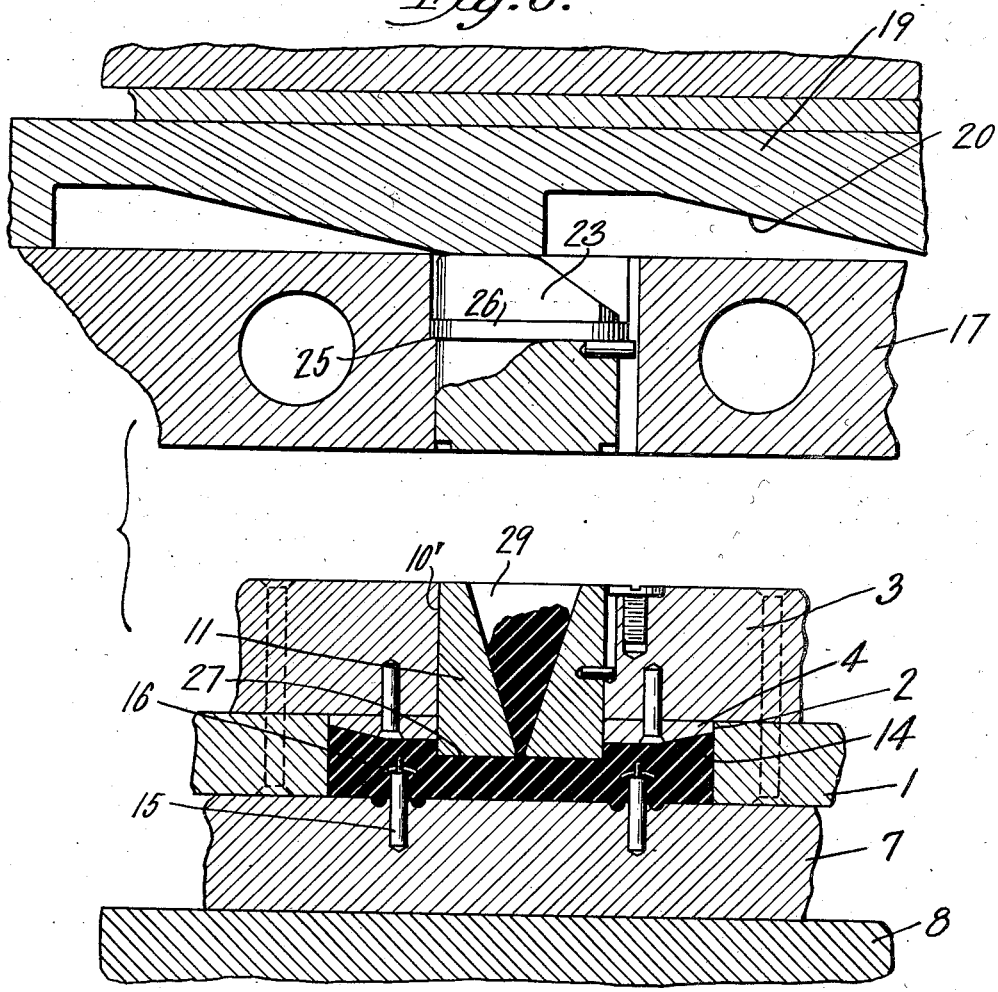

March 3, 1936.  H. Z. COBB  2,032,869
MEANS FOR MAKING MOLDED ARTICLES
Filed May 21, 1930  3 Sheets-Sheet 3
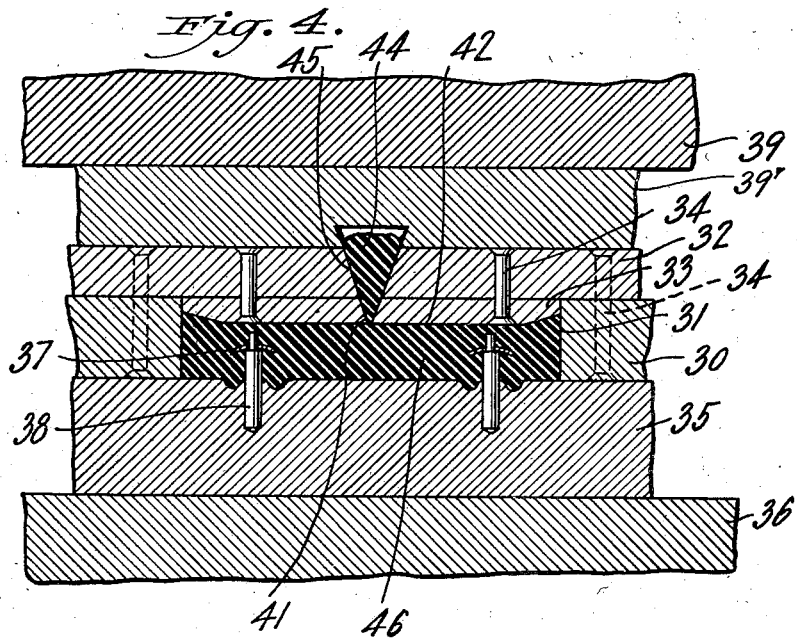
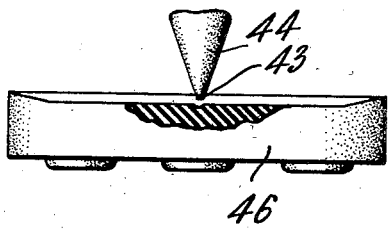
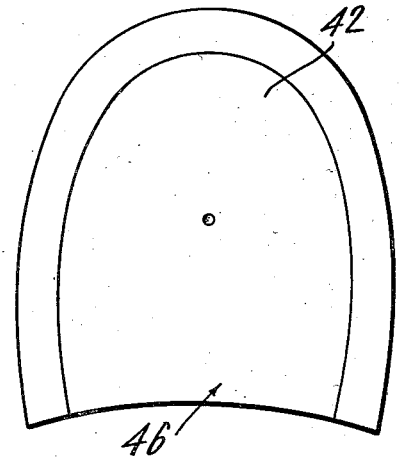
INVENTOR
Henry Z. Cobb
BY
ATTORNEY Patented Mar. 3, 1936

2,032,869

UNITED STATES PATENT OFFICE 2,032,869

MEANS FOR MAKING MOLDED ARTICLES

Henry Z. Cobb, Providence, R. I., assignor, by mesne assignments, to United States Rubber Company, New York, N. Y., a corporation of New Jersey Application May 21, 1930, Serial No. 454,215

1 Claim. (Cl. 18—23)

This invention relates to molding equipment and more particularly to a novel apparatus for manufacturing molded articles from plastic stock without the formation of a flash.

In producing molded articles from plastic stock, it was formerly the practice to place the stock between mold sections, press the sections together, and allow the excess to escape in the form of a flash at the sides of the mold. This was objectionable in that the labor required for trimming the flash increased the cost of production.

I overcome this objection by providing mold sections which cooperate to prevent the formation of flash in the molded article. A biscuit of plastic stock of a volume in excess of that of a molding cavity is placed between the mold sections which are then operated to shape the stock therebetween. During the shaping operation the excess is permitted to escape through a restricted opening or vent connecting the molding cavity to an auxiliary cavity, and is subsequently detached from the body of the molded article at a small neck produced by the vent.

In the accompanying drawings, which illustrate practical embodiments of my invention, Figure 1 is a vertical section of molding equipment suitable for the production of flashless heels;

Fig. 3 is a view similar to Fig. 1 and showing the upper platen and mold operating means in raised position;

Fig. 4 is a vertical section through a modified form of my molding equipment;

Fig. 5 is an elevation partly broken away of a rubber heel showing excess stock removed from the body; and Fig. 6 is a plan view of a rubber heel made in accordance with the invention.

Figure 1:
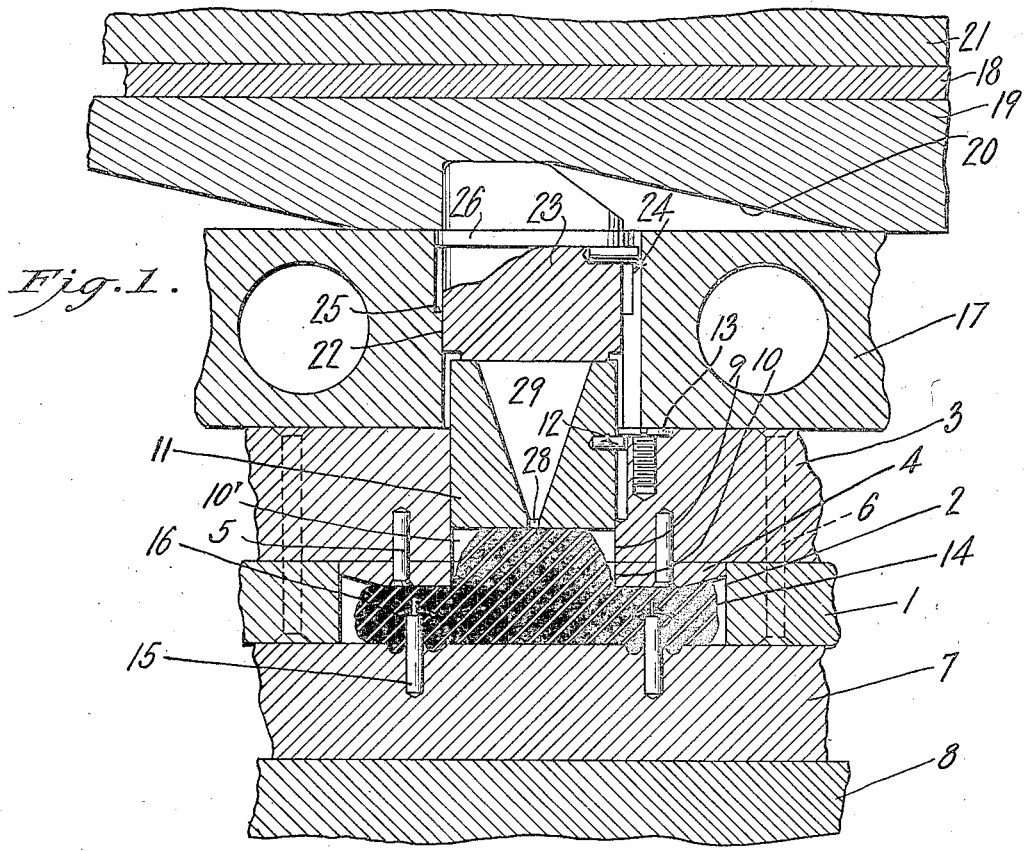
Figure 2:
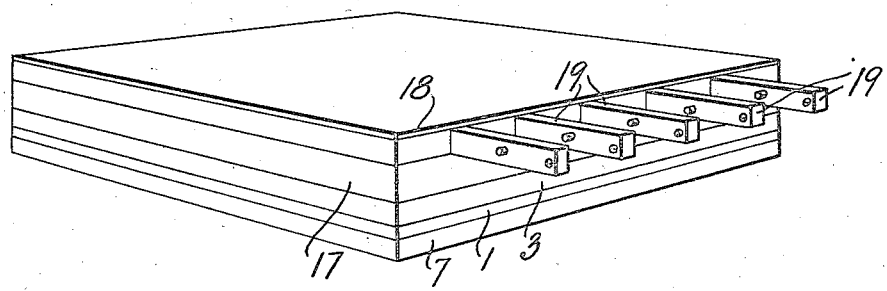
Fig. 2 is a perspective view of a gang mold and operating means associated therewith.

Referring at first to Figs. 1, 2, and 3 of the drawings, reference numeral 1 indicates an intermediate plate provided with an opening 2 and constituting, with top plates 3 and 4, a portion of an upper mold section, the three plates being secured together as by screws or rivets 5 and 6. The plates 3 and 4 are provided with openings, respectively 9 and 10, forming a cylinder 10' for a plunger 11, preferably having a pin and slot connection 12 with the plate 3, and a screw 13 for retaining the plunger 11 in operating position within the cylinder 10'. A lower mold section comprises a bottom plate 7 adapted to seat upon a base or lower platen 8.

In producing a molded article, such as a rubber heel, a biscuit of plastic rubber composition 14, of a volume in excess of that of the finished heel, is placed on the lower plate 7, preferably on pins 15 which carry washers 16 to be embedded in the heel. The upper section of the mold comprising plates 1, 3, 4 and the plunger 11, is then brought to position over the plastic stock 14 substantially as shown in Fig. 1. A mold operating device consisting of a heating plate 17, a plate 18 and a sliding bar 19 provided with a cam face 20 is carried by an upper platen 21 and is pressed down thereby to bring the bottom face of plate 1 against the top face of the lower mold section 7 so as to completely close the two mold sections at their line of separation around the stock 14. At this stage the stock is clear of the wall of the opening 2 and no flash is formed. Upon closing the mold sections to the Fig. 1 position, the central portion of the rubber stock flows into the cylinder 10' beneath the plunger 11 and raises the same to the position, for instance as illustrated in Fig. 1, depending upon the volume of the stock biscuit. The heating plate 17 has a bore 22 for a sliding element 23 which is brought to proper alignment by suitable means to insure operation of the plunger 11 when the bar 19 is moved to slide the cam-face 20 against the upper portion of the element 23. A pin and slot connection, as indicated at 24, may be provided between the element 23 and the heating plate 17, and the latter may have a shoulder 25 for cooperation wtih a rim 26 of the element 23 to retain the same within the bore 22 when the plate 17 is elevated as in Fig. 3.

After the described parts of the equipment have been brought to the Fig. 1 positions in relation to the stock 14, the bar 19 is moved to the left by any suitable operating means (not shown). This causes the element 23 to move the plunger 11 down into the cylinder 10', thereby forcing the rubber stock into all portions of the molding cavity formed by the previously closed sections. The plunger 11 may be arranged to produce a well 27. During this shaping operation the excess is permitted to escape through a relatively small vent 28 to an overflow cavity 29 in the plunger 11. After vulcanization the upper platen 21 carrying the mold operating means is raised to the Fig. 3 position and the excess stock removed from the body of the heel, preferably by directly a blast of air downwardly into the overflow cavity 29, whereby the excess is severed at the small neck produced by the vent. The heel is thus molded without the usual flash at the junction of its sides with its top and bottom faces.

Fig. 2 shows a gang mold of which the described structure is a molding unit and wherein a plurality of bars 19 are operable upon the sections of the various units, as will be readily understood.

Referring to Fig. 4, which illustrates a modified form of the invention, reference numeral 30 indicates a plate which is cut out, as indicated at 31 and forms with a plate 32 and a plate 33 the upper section of a mold, the three plates being secured together as by rivets 34 or otherwise. The lower section of the mold includes a plate 35 seated upon a lower platen 36.

In producing a molded article, a biscuit of plastic stock, such as rubber composition, of a volume slightly greater than the finished article, is placed upon the lower mold section 35 on which there may be located a series of washers 37 supported by pins 38. The upper half of the mold comprising the plates 30, 32, and 33 is then forced downwardly against the plastic stock by an upper platen 39 and an interposing plate 39' to produce the shaped body 46.

To prevent the formation of a flash at the sides of the stock during shaping in the mold, there is provided a small vent or opening 41 preferably in the upper half of the mold and within the area of the plate 33. The vent may be located centrally of a well 42 formed by the plate 33 in the finished heel. The excess stock flows through the vent 41 and forms a small neck 43 terminating in a head 44 within an auxiliary cavity 45 and may be readily removed from the molded body 46 by severing at the small neck produced by the vent.

Fig. 5 shows the heel after the excess has been severed from the body of the heel, and Fig. 6 is a face view of the finished heel. If a scar is left at the point of separation, it will be covered when the heel is attached to a shoe.

In the above described mold, in which an excess of stock is allowed to flow through a vent in easily detachable shape, instead of in the form of a flash at the sides of the mold, there is produced an article which is inexpensive to manufacture since trimming is eliminated.

It is to be understood in conclusion that while the invention has been illustrated herein as applied to the production of rubber heels, it is not limited thereto as it is evident that the underlying principles of the invention may be embodied in the production of various other articles produced from plastic stock and in which it is desired to eliminate the production of flash. It is therefore not intended to impose limitations other than set forth in the appended claim.

Having thus described my invention, what I claim and desire to protect by Letters Patent is:

A mold for shaping plastic stock, comprising separable sections defining a molding cavity and adapted to substantially completely enclose the stock without producing flash at the juncture of the sections, and said sections including a plunger movable against the enclosed stock to force it into all portions of the molding cavity, said plunger having an excess stock receiving cavity in communication with the molding cavity.

HENRY Z. COBB.